US009428196B2

(12) United States Patent
Ono

(10) Patent No.: US 9,428,196 B2
(45) Date of Patent: Aug. 30, 2016

(54) VEHICLE DRIVING BEHAVIOR PREDICTING DEVICE

(71) Applicant: TOYOTA JIDOSHA KABUSHIKI KAISHA, Toyota-shi, Aichi (JP)

(72) Inventor: Sayaka Ono, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/424,555

(22) PCT Filed: Sep. 19, 2012

(86) PCT No.: PCT/JP2012/073942
§ 371 (c)(1),
(2) Date: Feb. 27, 2015

(87) PCT Pub. No.: WO2014/045355
PCT Pub. Date: Mar. 27, 2014

(65) Prior Publication Data
US 2015/0217775 A1    Aug. 6, 2015

(51) Int. Cl.
*G06F 7/00* (2006.01)
*B60W 40/09* (2012.01)
*B60W 50/00* (2006.01)

(52) U.S. Cl.
CPC .............. *B60W 40/09* (2013.01); *B60W 20/11* (2016.01); *B60W 20/12* (2016.01); *B60W 50/0097* (2013.01); *B60W 2050/0089* (2013.01); *B60W 2510/18* (2013.01); *B60W 2520/10* (2013.01); *B60W 2520/105* (2013.01); *B60W 2540/30* (2013.01); *Y02T 10/84* (2013.01)

(58) Field of Classification Search
None
See application file for complete search history.

(56) References Cited

U.S. PATENT DOCUMENTS

| 2008/0120025 A1* | 5/2008 | Naitou | G01C 21/12 701/33.7 |
| 2010/0004839 A1* | 1/2010 | Yokoyama | B60W 30/16 701/70 |
| 2014/0032090 A1* | 1/2014 | Ono | G06F 17/00 701/119 |

FOREIGN PATENT DOCUMENTS

JP    2010-221962 A    10/2010

OTHER PUBLICATIONS

International Search Report for PCT/JP2012/073942 dated Oct. 23, 2012 [PCT/ISA/210].

* cited by examiner

*Primary Examiner* — Adam Alharbi
(74) *Attorney, Agent, or Firm* — Sughrue Mion, PLLC

(57) ABSTRACT

A vehicle driving behavior predicting device that predicts a driving behavior of a vehicle at a prediction target point based on speed information or acceleration information of the vehicle includes: a storage unit storing a reference template indicating a transition of the speed information or the acceleration information corresponding to the driving behavior being a prediction target in a predetermined prediction section to the prediction target point; a converting unit converting the reference template to a converted template indicating a transition of a speed or acceleration from an entry speed to a case in which the driving behavior being the prediction target is exhibited based on the entry speed of the vehicle into the prediction section; and a predicting unit predicting the driving behavior at the prediction target point by comparing the converted template with a current transition of the speed information or the acceleration information.

5 Claims, 6 Drawing Sheets

VEHICLE DRIVING BEHAVIOR PREDICTING DEVICE

CROSS REFERENCE TO RELATED APPLICATIONS

This application is a National Stage of International Application No. PCT/JP2012/073942, filed on Sep. 19, 2012, the contents of all of which are incorporated herein by reference in their entirety.

FIELD

The present invention relates to a vehicle driving behavior predicting device.

BACKGROUND

It is conventionally known that a driving assistance system which provides driving assistance to a driver of a vehicle predicts a feature driving behavior of the vehicle and provides the driving assistance based on the predicted driving behavior. Patent Literature 1 discloses the technology to estimate the driving behavior at a target point by storing a template indicating a typical driving behavior in a certain section before the target point of the driving assistance and comparing actual driving data with the template, for example, as such vehicle driving behavior predicting device.

CITATION LIST

Patent Literature

Patent Literature 1: Japanese Patent Application Laid-open No. 2010-221962

SUMMARY

Technical Problem

However, when the template is used for predicting the driving behavior as in Patent Literature 1, the typical driving behavior indicated by the template differs according to a traveling state of the vehicle such as a traveling speed, for example. Therefore, it is required to prepare various templates according to the traveling states of the vehicle for improving prediction accuracy of the driving behavior. The increased number of templates requires a large capacity of storage means for storing the templates and this might increase a manufacturing cost.

The present invention is achieved in consideration of the above and an object thereof is to provide a vehicle driving behavior predicting device capable of minimizing a storage capacity for storing a template while maintaining sufficient prediction accuracy of a driving behavior of a vehicle by using the template.

Solution to Problem

In order to solve the above-described problem, a vehicle behavior predicting device according to the present invention is a vehicle driving behavior predicting device configured to predict a vehicle behavior at a prediction target point based on traveling state information indicating a traveling state of a vehicle, the device provided with storage means which stores a template including feature information indicating a typical transition of the traveling state information for each vehicle behavior in a predetermined prediction section to the prediction target point, converting means which converts at least a part of the feature information in the template based on an entry speed of the vehicle into the prediction section, and predicting means which predicts the vehicle behavior of the vehicle at the prediction target point by comparing the template converted by the converting means with current traveling state information of the vehicle.

In the above-described vehicle behavior predicting device, it is preferable that the vehicle behavior includes a decelerating behavior of the vehicle, and the feature information converted by the converting means includes positional information indicating a distance from the prediction target point and the traveling state information at an accelerator-off point and a brake-on point of the decelerating behavior.

In the above-described vehicle behavior predicting device, it is preferable that the traveling state information includes speed information of the vehicle, the converting means converts the speed information at the accelerator-off point so as to be decreased according to the entry speed and converts the positional information at the accelerator-off point so as to approach the prediction target point as the entry speed of the vehicle into the prediction section becomes lower, and converts the speed information and the positional information at the brake-on point based on change amounts of the speed information and the positional information between the accelerator-off point and the brake-on point before conversion and the speed information and the positional information at the converted accelerator-off point.

In the above-described vehicle behavior predicting device, it is preferable that the traveling state information includes acceleration information of the vehicle, the converting means converts the positional information at the accelerator-off point so as to approach the prediction target point as the entry speed of the vehicle into the prediction section becomes lower, and converts the acceleration information and the positional information at the brake-on point based on change amounts of the acceleration information and the positional information between the accelerator-off point and the brake-on point before the conversion, the acceleration information at the accelerator-off point, and the positional information at the converted accelerator-off point.

Advantageous Effects of Invention

The vehicle driving behavior predicting device according to the present invention has an effect of minimizing the storage capacity for storing the template while maintaining the sufficient prediction accuracy of the driving behavior of the vehicle by using the template.

DESCRIPTION OF EMBODIMENTS

Figure 1:
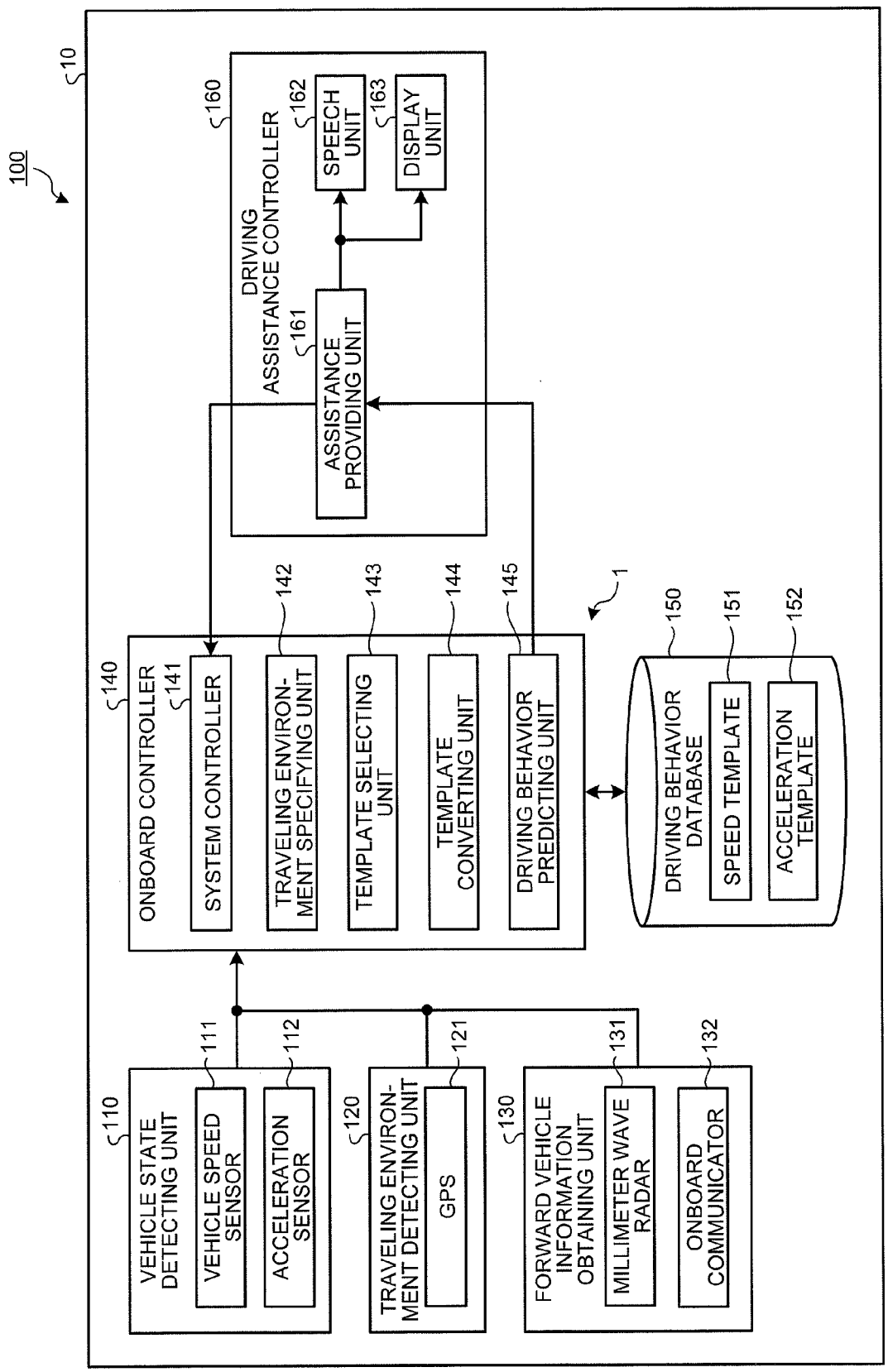
FIG. 1 is a block diagram illustrating an example of a configuration of a driving assistance system to which a vehicle driving behavior predicting device according to this embodiment is applied.

An embodiment of a vehicle driving behavior predicting device according to the present invention is hereinafter described with reference to the drawings. Meanwhile, in the following drawings, the same reference numeral is assigned to the same or corresponding part and the description thereof is not repeated.

A configuration of the vehicle driving behavior predicting device according to the embodiment of the present invention is described with reference to FIG. 1. FIG. 1 is a block diagram illustrating an example of a configuration of a driving assistance system to which the vehicle driving behavior predicting device according to this embodiment is applied.

As illustrated in FIG. 1, a vehicle driving behavior predicting device 1 according to this embodiment is applied to a driving assistance system 10 mounted on a vehicle 100 as an own vehicle.

The vehicle 100 is provided with any one of an engine, a motor and the like as a drive source for travel for allowing a rotary drive of a drive wheel. The vehicle 100 may be the vehicle of any type such as a hybrid vehicle (HV) provided with both the engine and the motor, a conventional vehicle provided with the engine but without the motor, and an electric vehicle (EV) provided with the motor but without the engine.

The driving assistance system 10 is roughly provided with a vehicle state detecting unit 110, a traveling environment detecting unit 120, a forward vehicle information obtaining unit 130, an onboard controller 140, a driving behavior database 150 (storage means), and a driving assistance controller 160.

The driving assistance system 10 predicts a driving behavior of a vehicle being a prediction target at a predetermined prediction target point (such as an intersection) based on traveling state information indicating a traveling state of the vehicle being the prediction target. This may provide driving assistance information according to the predicted driving behavior to a driver of the own vehicle 100. The vehicle driving behavior predicting device 1 according to this embodiment is a component regarding a prediction of the driving behavior in the driving assistance system 10 and specifically relates to the onboard controller 140 and the driving behavior database 150 out of components of the above-described driving assistance system 10.

Meanwhile, in this embodiment, a forward vehicle traveling in front of the vehicle 100 is the vehicle being the prediction target. In this embodiment, the driving behavior to be predicted includes a decelerating behavior and a non-decelerating behavior such as cruise travel of the forward vehicle at the prediction target point such as the intersection, a crosswalk point, a T-junction, and a point in front of a store entrance. In the following description, the prediction target point is also referred to as the "intersection" being an example thereof. Each element of the driving assistance system 10 and the vehicle driving behavior predicting device 1 is hereinafter individually described.

The vehicle state detecting unit 110 detects the traveling state of the own vehicle (vehicle 100) out of the traveling state information. The vehicle state detecting unit 110 is provided with a vehicle speed sensor 111 which detects a traveling speed of the vehicle 100, an acceleration sensor 112 which detects acceleration of the vehicle 100 and the like, for example. The vehicle speed sensor 111 and the acceleration sensor 112 are electrically connected to the onboard controller (ECU) 140 in which detection results of various sensors and the like are summarized through an onboard network such as a CAN (control area network), for example. The vehicle speed sensor 111 detects a wheel rotational speed and outputs a signal according to the detected rotational speed to the onboard controller 140. The acceleration sensor 112 detects the acceleration of the vehicle 100 and outputs a signal according to the detected acceleration to the onboard controller 140.

The traveling environment detecting unit 120 detects a traveling position or the traveling environment of the own vehicle or the forward vehicle out of the traveling state information. The traveling environment detecting unit 120 is provided with a GPS 121 and the like which receives a satellite signal to detect an absolute position, that is to say, latitude and longitude of the vehicle 100 or the forward vehicle based on the received satellite signal, for example. The GPS 121 detects the latitude and longitude of the vehicle 100 or the forward vehicle changing according to movement of the vehicle 100 or the forward vehicle, in other words, the latitude and longitude of each point at which the vehicle 100 or the forward vehicle travels and outputs latitude/longitude information indicating a detection result to the onboard controller 140.

The forward vehicle information obtaining unit 130 obtains the information indicating the traveling state and the like of the forward vehicle out of the traveling state information. The forward vehicle includes not only one vehicle traveling right in front of the vehicle 100 traveling in front of the vehicle 100 in a traveling direction but also a plurality of vehicles traveling in front of the vehicle 100 in the traveling direction. The forward vehicle information obtaining unit 130 is provided with a millimeter wave radar 131 which detects presence of the forward vehicle traveling in front of the vehicle 100 in the traveling direction by using an electric wave in a millimeter waveband and an onboard communicator 132 which performs inter-vehicle communication with the vehicle traveling around the vehicle 100 and road-to-vehicle communication with a roadside communicator located on a roadside. When the millimeter wave radar 131 detects the presence of the forward vehicle traveling in front of the vehicle 100 in the traveling direction, this outputs a signal indicating a detection result to the onboard controller 140. The onboard communicator 132 obtains the information indicating the traveling state such as the traveling speed or the acceleration of the forward vehicle through the inter-vehicle communication with the forward vehicle traveling in front of the vehicle 100 in the traveling direction, for example. The onboard communicator 132 outputs the obtained information to the onboard controller 140.

In this embodiment, detecting means includes the vehicle state detecting unit 110, the traveling environment detecting unit 120, and the forward vehicle information obtaining unit 130. The detecting means detects the traveling state information of the vehicle (including the own vehicle and the forward vehicle).

The onboard controller 140 controls each unit of the driving assistance system 10 such as the driving assistance controller 160 based on various pieces of traveling state information input from the detecting means. The onboard controller 140 is provided with a system controller 141, a traveling environment specifying unit 142, a template selecting unit 143, a template converting unit 144 (converting means), and a driving behavior predicting unit 145 (predicting means).

When detection results of driving operation elements are input from the vehicle state detecting unit 110, the system controller 141 controls various onboard devices based on the detection results. Specifically, the system controller 141 controls the various onboard devices such as the engine, a brake, a turn-signal lamp, and a steering wheel based on the detection results of the vehicle speed sensor 111 and the acceleration sensor 112 and the detection results of an accelerator sensor, a brake sensor, a steering angle sensor and the like input from the vehicle state detecting unit 110. According to this, when the detection result of the accelerator sensor and the like changes by depression of an accelerator pedal by the driver, for example, a control amount of the engine is calculated according to the detection result and the engine is controlled according to a calculated result.

The traveling environment specifying unit 142 specifies the traveling environment of the vehicle 100 or the forward vehicle based on the information such as the latitude/longitude information of the vehicle 100 or the forward vehicle input from the traveling environment detecting unit 120. The traveling environment includes an element which affects a vehicle behavior such as a road type such as the intersection and a curve, a shape, a road line shape, a road width, a curvature, a gradient and the like. When the traveling environment specifying unit 142 specifies the traveling environment of the vehicle 100 or the forward vehicle, this outputs the information to the template selecting unit 143.

The template selecting unit 143 selects a template associated with a prediction section in which the driving behavior of the forward vehicle is predicted based on the traveling environment specified by the traveling environment specifying unit 142 and obtains the same from the driving behavior database 150. Herein, a predetermined section to the prediction target point (such as the intersection) in front of the vehicle may be set as the prediction section. The template selecting unit 143 may detect the prediction target point and the prediction section located in front of the vehicle on a traveling road based on the traveling environment specified by the traveling environment specifying unit 142. The term "template" used in the embodiment is intended to mean a group of information including feature information indicating a typical transition of the traveling state information for each driving behavior and indicates, in other words, the transition of the traveling state information of the vehicle corresponding to the driving behavior being the prediction target in a predetermined prediction section to the prediction target point. A speed template 151 and an acceleration template 152 indicating the transitions of the speed and the acceleration of the traveling state information are stored in the driving behavior database 150.

Figure 2:
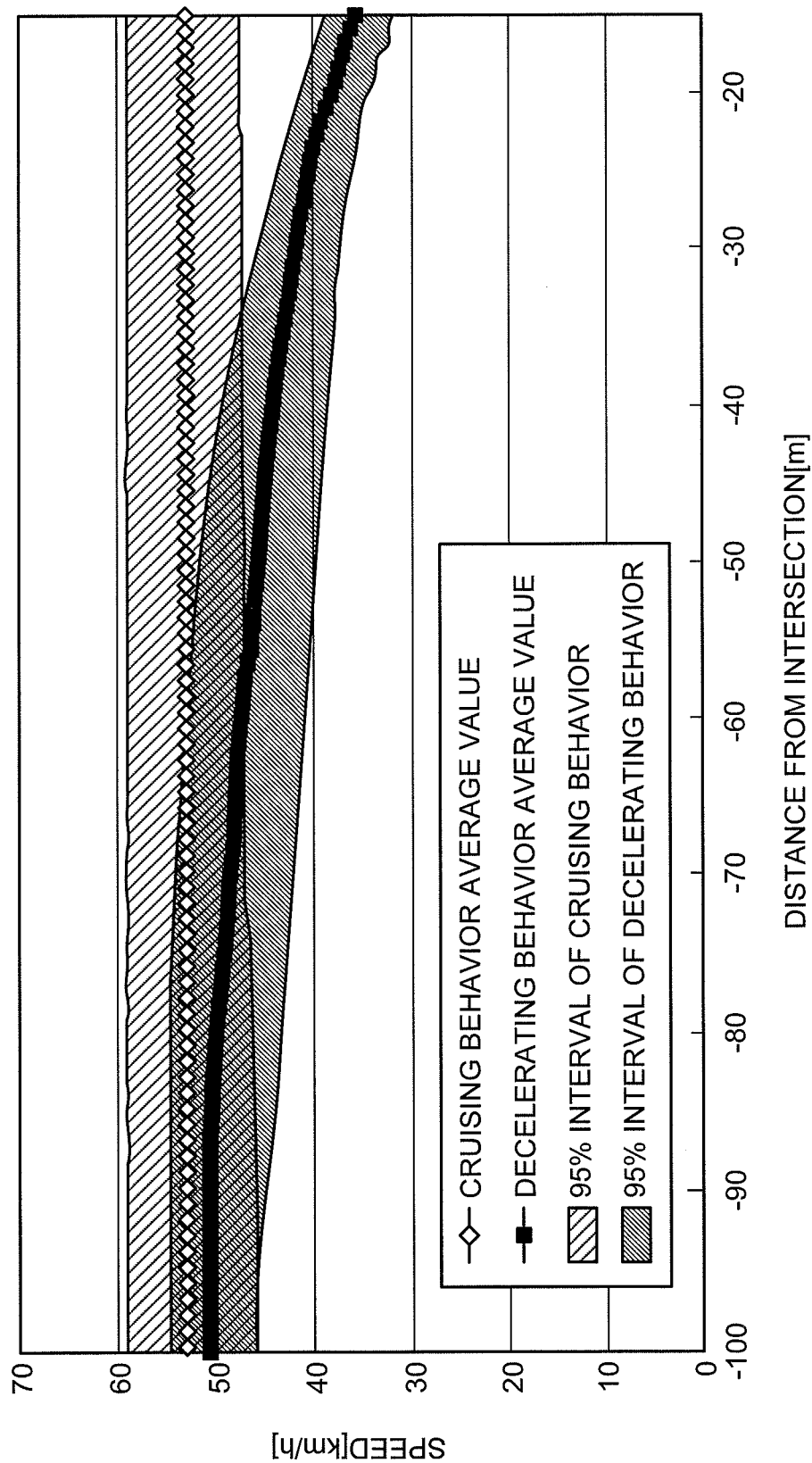
FIG. 2 is a view illustrating an example of a speed template stored in a driving behavior database.

Herein, the speed template 151 and the acceleration template 152 stored in the vehicle behavior database 150 are described with reference to FIGS. 2 and 3. FIG. 2 is a view, illustrating an example of the speed template 151 stored in the vehicle behavior database. A distance (m) from the intersection being the prediction target point and speed information (km/h) are represented along a horizontal axis and a vertical axis, respectively, of the speed template 151 in FIG. 2.

The speed template 151 includes the typical transition of the speed information of the vehicle according to the distance to the prediction target point in the predetermined prediction section before the prediction target point. The speed template 151 includes individual speed transition patterns in two different driving behaviors: the driving behavior at the time of deceleration toward the prediction target point (decelerating behavior) and the driving behavior at the time of passage of the prediction target point at a cruising speed without deceleration (cruising behavior). The cruising behavior is an example of the above-described non-decelerating behavior. Herein, the cruising behavior is the traveling state in which the speed does not monotonically increase, does not monotonically decrease, or is not at 0 (km/h) with variation in speed in a certain distance section or time section within a predetermined range σ, and it may be defined that the cruising speed is an average speed in the cruising behavior. The predetermined range σ of the variation may be obtained from the speed information at the time of steady driving by the driver, for example.

It is possible to create the speed transition pattern of the decelerating behavior by averaging data of the speed transition in the prediction section when the vehicle 100 or the forward vehicle turns right or left, for example. It is possible to create the speed transition pattern of the cruising behavior by averaging data of the speed transition in the prediction section when the vehicle 100 or the forward vehicle goes straight, for example. As illustrated in FIG. 2, an average value and a 95% confidence interval of the speed transition of the decelerating behavior and an average value and a 95% confidence interval of the speed transition of the cruising behavior are recorded in the speed template 151.

As illustrated in FIG. 2, in the speed template 151, the speed transition is substantially constant such that the speed variation falls within a certain range based on a predetermined cruising speed at the time of the cruising behavior. In the decelerating behavior, although the speed is substantially the same as that of the cruising behavior just after an entry into the prediction section (−100 m in FIG. 2), the speed gradually decreases as the distance to the prediction target point becomes shorter.

Figure 3:
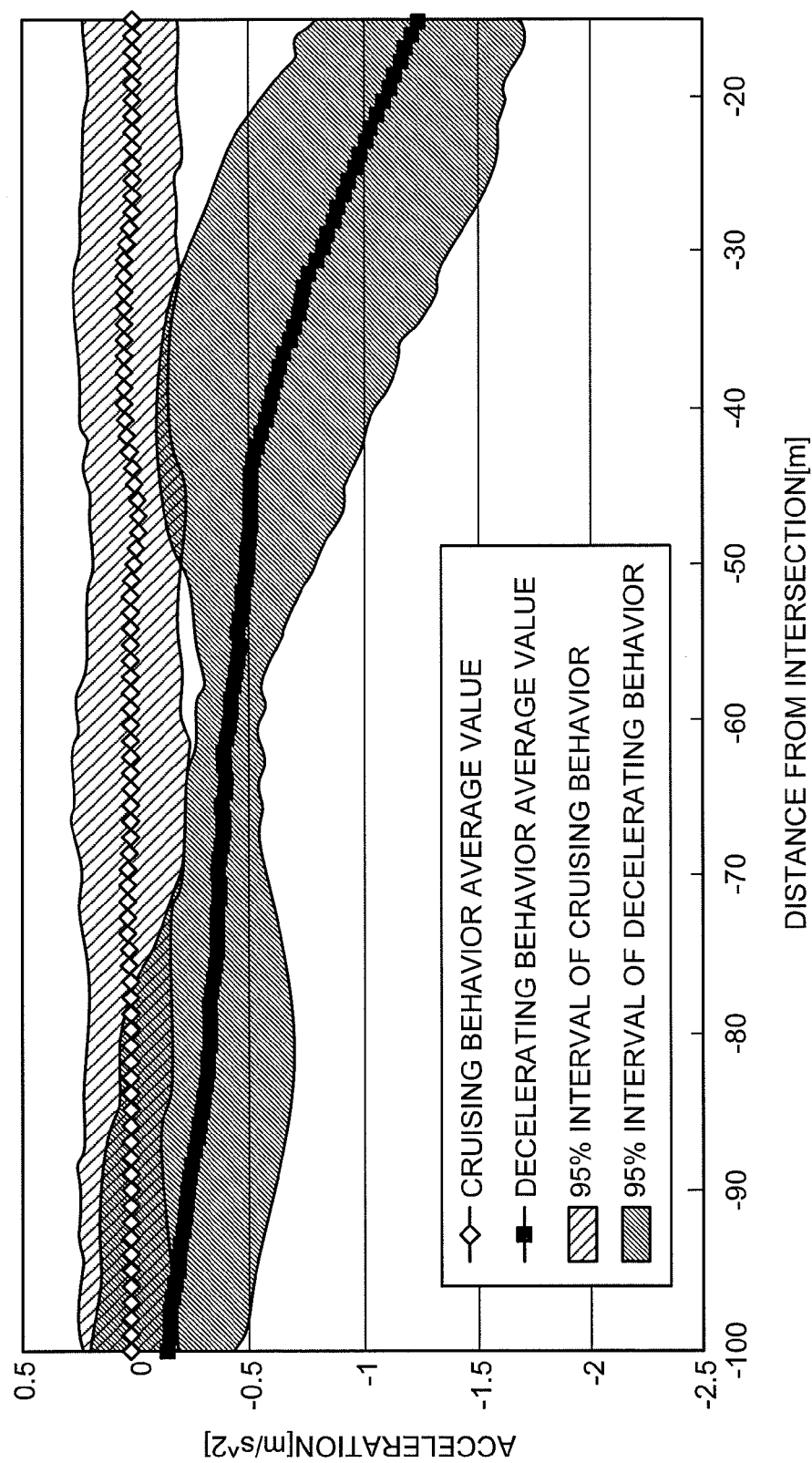
FIG. 3 is a view illustrating an example of an acceleration template stored in the driving behavior database.

FIG. 3 is a view illustrating an example of the acceleration template 152 stored in the vehicle behavior database. The distance (m) from the intersection being the prediction target point and the acceleration information (m/s^2) are represented along a horizontal axis and a vertical axis, respectively, of the acceleration template 152 in FIG. 3. The acceleration template 152 includes the typical transition of the acceleration information of the vehicle according to the distance to the prediction target point in the predetermined prediction section before the prediction target point. The acceleration template 152, as well as the speed template 151, includes individual acceleration transition patterns in the two different driving behaviors: the decelerating behavior and the cruising behavior. It is possible to create the acceleration transition patterns, as well as the speed transition patterns, by averaging data of the acceleration transition in the prediction section of the vehicle 100 or the forward vehicle. As illustrated in FIG. 3, an average value and a 95% confidence interval of the acceleration transition of the decelerating behavior and an average value and a 95% confidence interval of the acceleration transition of the cruising behavior are recorded in the acceleration template 152.

As illustrated in FIG. 3, in the acceleration template 152, the acceleration transition is substantially constant such that acceleration variation falls within a certain range based on the acceleration of 0 in a case of the cruising behavior. In the decelerating behavior, although the acceleration is substantially 0 as in the cruising behavior just after the entry into the prediction section, the acceleration gradually increases in a negative direction, that is to say, the deceleration increases as the distance to the prediction target point becomes shorter.

In this embodiment, a set of the speed template 151 and the acceleration template 152 created based on the speed and acceleration patterns in the cruising behavior and the decelerating behavior at the time of the entry into the prediction section at a certain cruising speed are associated with a certain prediction target point. That is to say, when it is specified that the vehicle 100 or the forward vehicle approaches a certain prediction target point, the template selecting unit 143 always selects the same template from the driving behavior database 150 regardless of an entry speed even when the entry speed into the prediction section is different from the cruising speed of the template. The template selecting unit 143 outputs the selected speed template 151 and the acceleration template 152 to the template converting unit 144.

With reference to FIG. 1 again, the template converting unit 144 converts the speed template 151 and the acceleration template 152 selected by the template selecting unit 143 according to the traveling state (the entry speed into the prediction section in this embodiment) of the forward vehicle being the target vehicle. In other words, the template converting unit 144 converts the speed template 151 and the acceleration template 152 selected by the template selecting unit 143 to a form indicating the transition of the speed or the acceleration from the entry speed to a case in which the driving behavior being the prediction target is exhibited. The entry speed may be an average value of the speed in the predetermined section before the forward vehicle enters the prediction section or the vehicle speed when this enters the prediction section. The entry speed may be calculated from the speed information of the forward vehicle obtained by the forward vehicle information obtaining unit 130.

In more detail, the template converting unit 144 converts positional information indicating the distance from the prediction target point and the speed information at an accelerator-off point and a brake-on point out of the feature information included in the speed template 151 according to the entry speed into the prediction section, thereby changing the speed transition pattern of the speed template 151 to an appropriate form according to the entry speed. The template converting unit 144 converts the positional information indicating the distance from the prediction target point and the acceleration information at the accelerator-off point and the brake-on point out of the feature information included in the acceleration template 152 according to the entry speed into the prediction section, thereby changing the acceleration template 152 to an appropriate form according to the entry speed.

Figure 4:
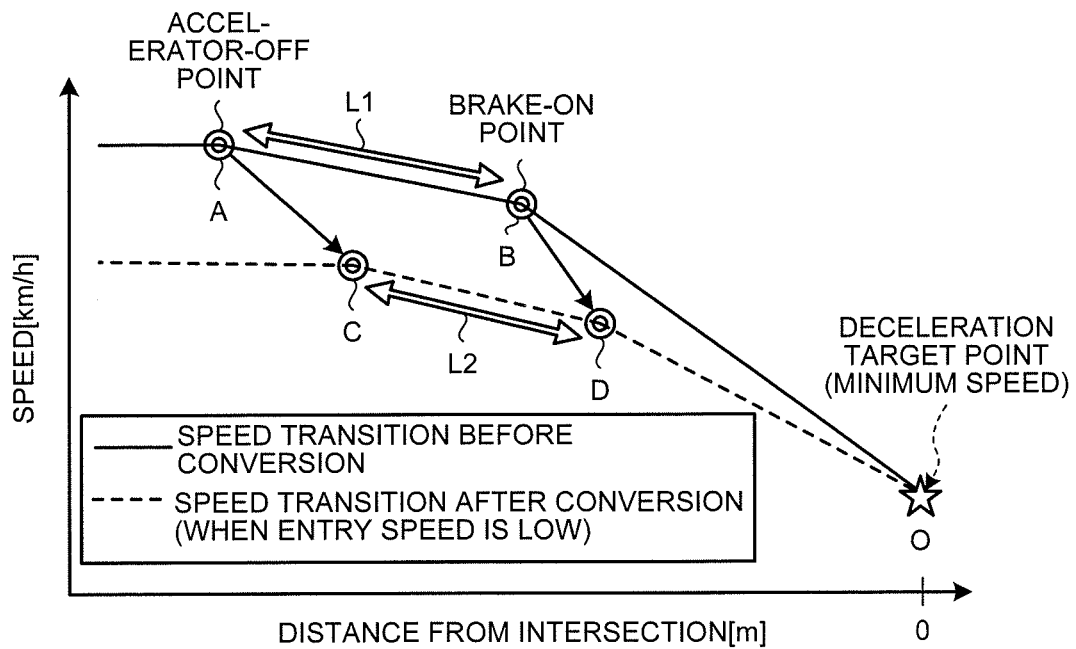
FIG. 4 is a schematic diagram for illustrating an example of a method of converting the speed template by a template converting unit.
Figure 5:
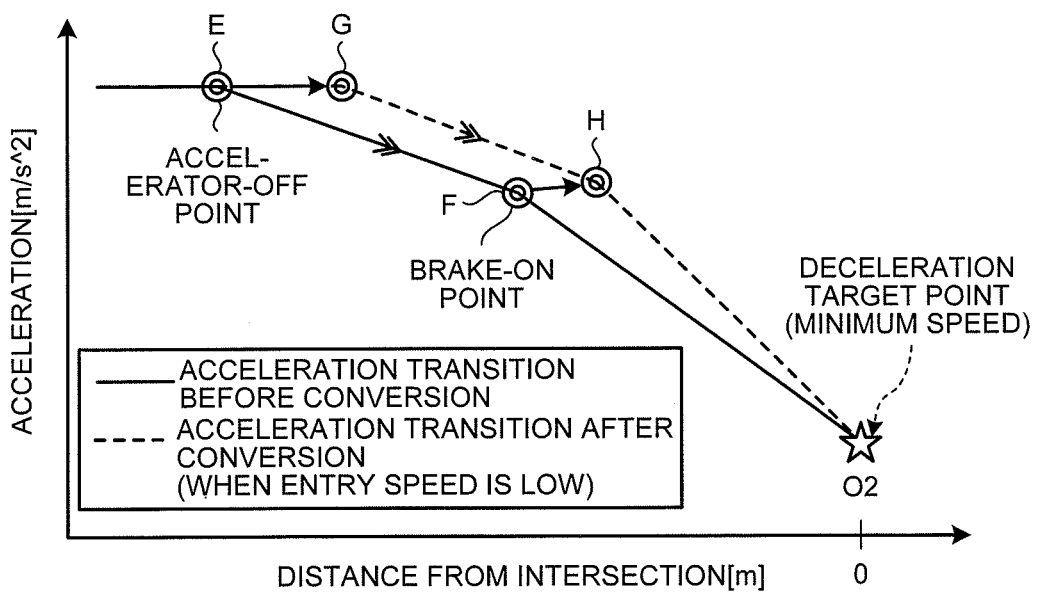
FIG. 5 is a schematic diagram for illustrating an example of a method of converting the acceleration template by the template converting unit.

Herein, a method of converting the speed template 151 and the acceleration template 152 by the template converting unit 144 is described with reference to FIGS. 4 and 5. FIG. 4 is a schematic diagram for illustrating an example of the method of converting the speed template 151 by the template converting unit 144 and FIG. 5 is a schematic diagram for illustrating an example of the method of converting the acceleration template 152 by the template converting unit 144. The vertical axis and the horizontal axis in FIGS. 4 and 5 are the same as those in FIGS. 2 and 3. In FIG. 4, the speed transition before conversion is indicated by a solid line and the speed transition after the conversion is indicated by a dotted line. Similarly, in FIG. 5, the acceleration transition before the conversion is indicated by a solid line and the acceleration transition after the conversion is indicated by a dotted line.

An example of converting the speed template 151 is described with reference to FIG. 4. In the speed transition pattern of the decelerating behavior in the speed template 151, the feature information regarding the method of converting includes: (1) the positional information and the speed information at an accelerator-off point A where the driver turns off the accelerator, (2) required time while the accelerator is turned off, (3) the positional information and the speed information at a brake-on point B where the driver turns on the brake, and (4) a minimum speed at a deceleration target point (prediction target point) O, as illustrated in FIG. 4. The speed undergoes a transition so as to reach the deceleration target point O with smooth deceleration through the accelerator-off point A and the brake-on point B.

Herein, a case in which the entry speed of the vehicle into the prediction section becomes lower than the cruising speed of the speed template 151 is considered. In this case, a situation in which accelerator-off operation by the driver is delayed and the accelerator-off point A approaches the deceleration target point (intersection) O is considered. Brake-on operation is also delayed according to this and the brake-on point B also approaches the deceleration target point O. That is to say, it may be considered that there is a correlation among the entry speed of the vehicle into the prediction section, the accelerator-off point A, and the brake-on point B. On the other hand, the required time from the accelerator-off operation to the brake-on operation does not depend on the entry speed of the vehicle. In the decelerating behavior, the minimum speed at a final deceleration target point O and a position at which the state is realized (the distance from the intersection=0) remain unchanged regardless of the entry speed of the vehicle.

Therefore, in this embodiment, out of the feature information regarding the speed transition pattern of the speed template 151, the feature information depending on the entry speed into the prediction section (accelerator-off point and brake-on point) are converted according to the entry speed and the feature information independent from the entry speed (accelerator-off time and deceleration target point) are fixed to be used. Specifically, a motion amount (in a direction of the horizontal axis in FIG. 4) of the positional information at the accelerator-off point A is first calculated according to the entry speed of the vehicle. It is possible to calculate the motion amount of the positional information by using a function derived by a learning process by using past travel data, for example. Input and output of the function are the entry speed and the motion amount of the positional information at the accelerator-off point A, respectively. Next, a motion amount (in a direction of the vertical axis in FIG. 4) of the speed information at the accelerator-off point A is obtained based on the entry speed. It is possible to calculate the motion amount of the speed information by multiplying a predetermined coefficient by difference between the speed information at the accelerator-off point A before the conversion and the entry speed, for example. According to this, the motion amount of the positional information and the motion amount of the speed information at the accelerator-off point A are calculated and the accelerator-off point may be moved. In the example in FIG. 4, the entry speed is lower than the cruising speed, so that this is moved to an accelerator-off point C with a shorter distance from the intersection and a lower speed than those at the accelerator-off point A.

Next, a line segment connecting the accelerator-off point A and the brake-on point B before the conversion is moved in parallel such that this passes through the accelerator-off point C after the conversion. Since the required time from the accelerator-off operation to the brake-on operation is constant regardless of the entry speed, so that a length of the line segment is increased or decreased according to the entry speed. In the example in FIG. 4, the entry speed is lower than the cruising speed, so that a length L2 of the line segment is made shorter than a length L1 of the line segment between A and B. Furthermore, a brake-on point D after the conversion is plotted at an end on a side opposite to the accelerator-off point C of the line segment.

After the accelerator-off point C and the brake-on point D are determined in this manner, it is possible to form the speed transition pattern of the decelerating behavior after the conversion as indicated by the dotted line in FIG. 4 by using a well-known interpolating method such as linear interpolation and secondary interpolation among three points of these points and the deceleration target point O.

In the speed transition pattern of the cruising behavior in the speed template 151, it is possible to form the speed transition pattern of the cruising behavior after the conversion by moving the average value of the cruising speed in parallel in the direction of the vertical axis in FIG. 4 according to the entry speed, for example.

An example of converting the acceleration template 152 is described with reference to FIG. 5. In the acceleration transition pattern of the decelerating behavior in the acceleration template 152, the feature information regarding the method of converting includes: (1) the acceleration information and the positional information at an accelerator-off point E, (2) declination of the acceleration while the accelerator is turned off, (3) the acceleration information and the positional information at a brake-on point F, and (4) minimum acceleration at a deceleration target point (prediction target point) O2, as illustrated in FIG. 5. The acceleration undergoes a transition so as to reach the deceleration target point O2 with a smooth increase in the acceleration in the negative direction through the accelerator-off point E and the brake-on point F.

Herein, a case in which the entry speed of the vehicle into the prediction section becomes lower than the cruising speed of the acceleration template 152 is considered. In this case, a situation in which the accelerator-off operation by the driver is delayed and the accelerator-off point E approaches the deceleration target point O2 is considered. The brake-on operation is also delayed according to this and the brake-on point F also approaches the deceleration target point O2. That is to say, it may be considered that there is a correlation between the entry speed of the vehicle and the positional information of the accelerator-off point E and the brake-on point F.

On the other hand, the acceleration is substantially constant when the accelerator is turned off, so that the acceleration information at the accelerator-off point E does not depend on the entry speed. After the accelerator is turned off, predetermined deceleration such as engine braking occurs, so that the acceleration changes with a substantially constant pattern without depending on the entry speed. Since there is repeatability in the decelerating behavior of the driver, so that magnitude of the minimum acceleration at the deceleration target point O2 and the position at which the state is realized (the distance from the intersection=0) are constant regardless of the entry speed of the vehicle.

Therefore, in this embodiment, out of the feature information regarding the acceleration transition pattern of the acceleration template 152, the feature information depending on the entry speed into the prediction section (accelerator-off point and brake-on point) are converted according to the entry speed and the feature information independent from the entry speed (the declination of the acceleration while the accelerator is turned off and the deceleration target point) are fixed to be used. First, a motion amount (in a direction of the horizontal axis in FIG. 5) of the positional information at the accelerator-off point E is calculated according to the entry speed of the vehicle. It is possible to use a function derived by the learning process by using the past travel data, for example, as at the accelerator-off point A in FIG. 4 for calculating the motion amount of the positional information. Input and output of the function are the entry speed and the motion amount of the positional information at the accelerator-off point E, respectively. Meanwhile, the acceleration is substantially constant when the accelerator is turned off, so that a motion amount of the acceleration information from the accelerator-off point E (in a direction of the vertical axis in FIG. 5) is set to 0. According to this, it is possible to move the accelerator-off point E in the horizontal direction. In the example in FIG. 5, the entry speed is lower than the cruising speed, so that this is moved in parallel to an accelerator-off point G with a shorter distance from the intersection than that of the accelerator-off point E.

Next, a line segment connecting the accelerator-off point E and the brake-on point F before the conversion is moved in parallel such that this passes through the accelerator-off point G after the conversion. A brake-on point H after the conversion is plotted at an end on a side opposite to the accelerator-off point G of the line segment.

After the accelerator-off point G and the brake-on point H are determined in this manner, it is possible to form the acceleration transition pattern of the decelerating behavior after the conversion as indicated by the dotted line in FIG. 5 by using the well-known interpolating method such as the linear interpolation and the secondary interpolation among three points of these points and the deceleration target point O2.

In the acceleration transition pattern of the cruising behavior in the acceleration template 152, the average value of the acceleration transition does not depend on the entry speed of the vehicle and is maintained in the vicinity of the acceleration of 0, so that the same one is always used.

Meanwhile, in this embodiment, the speed template 151 and the acceleration template 152 stored in the driving behavior database 150 are also referred to as "reference templates", and the speed template 151 and the acceleration template 152 converted by the template converting unit 144 are also referred to as "converted templates".

With reference to FIG. 1 again, the driving behavior predicting unit 145 compares the speed template 151 and the acceleration template 152 converted by the template converting unit 144 with time-series change in the traveling state information of the vehicle at present time detected by the detecting means (current transition of speed information and acceleration information of the vehicle) to predict the driving behavior at the prediction target point. When the driving behavior predicting unit 145 recognizes that there is the forward vehicle in front of the vehicle 100 in the traveling direction based on the information input from the forward vehicle information obtaining unit 130, this predicts the driving behavior of the forward vehicle. The driving behavior predicting unit 145 predicts whether the decelerating behavior occurs, for example, as the driving behavior of the forward vehicle. The driving behavior predicting unit 145 may determine that the decelerating behavior of the forward vehicle is uncertain when this cannot predict whether the decelerating behavior of the forward vehicle occurs or not with high probability.

The driving assistance controller 160 performs control regarding various types of driving assistance based on the prediction result by the driving behavior predicting unit 145. The driving assistance controller 160 is provided with an assistance providing unit 161, a speech unit 162, and a display unit 163.

When the prediction result of the driving behavior of the forward vehicle is input from the driving behavior predicting unit 145, the assistance providing unit 161 obtains control amounts of various control devices controlled by the above-described system controller 141, for example, based on the prediction result and outputs the obtained control amounts to the system controller 141. According to this, when the prediction result of the driving behavior predicting unit 145 indicates the occurrence of the decelerating behavior of the forward vehicle, for example, this turns off the engine or turns on the brake at the timing at which the forward vehicle decelerates or before the timing. When the vehicle 100 is the hybrid vehicle, the assistance providing unit 161 executes brake regeneration at the timing at which the forward vehicle decelerates or before the timing. The assistance providing unit 161 generates speech data or image data for speech guidance or image guidance about the decelerating behavior to be performed by the forward vehicle, for example, and outputs the generated speech data or image data to the speech unit 162 and the display unit 163 at the timing at which the forward vehicle decelerates or before the timing. According to this, the guidance to urge the driver of the vehicle 100 to decelerate the vehicle 100 is provided when the forward vehicle decelerates or before the deceleration is started through the speech unit 162 and the display unit 163.

On the other hand, when the prediction result of the driving behavior predicting unit 145 indicates that the decelerating behavior of the forward vehicle does not occur, that is to say, the driving behavior of the forward vehicle is the cruising behavior (non-decelerating behavior), the assistance providing unit 161 does not execute deceleration assistance through the system controller 141, the speech unit 162, and the display unit 163. At that time, the assistance providing unit 161 may notify the driver that the forward vehicle does not perform the decelerating behavior through the speech unit 162 and the display unit 163, for example. Similarly, the assistance providing unit 161 does not execute the deceleration assistance through the system controller 141, the speech unit 162, and the display unit 163 also when a determination result that the driving behavior of the forward vehicle is uncertain is input from the driving behavior predicting unit 145.

Each function of the onboard controller 140 and the assistance providing unit 161 of the driving assistance controller 160 is realized by an electronic control unit (ECU) mounted on the vehicle 100. The ECU is formed as an electronic circuit mainly formed of a well-known microcomputer including a CPU, a ROM, a RAM, and an interface, for example.

Figure 6:
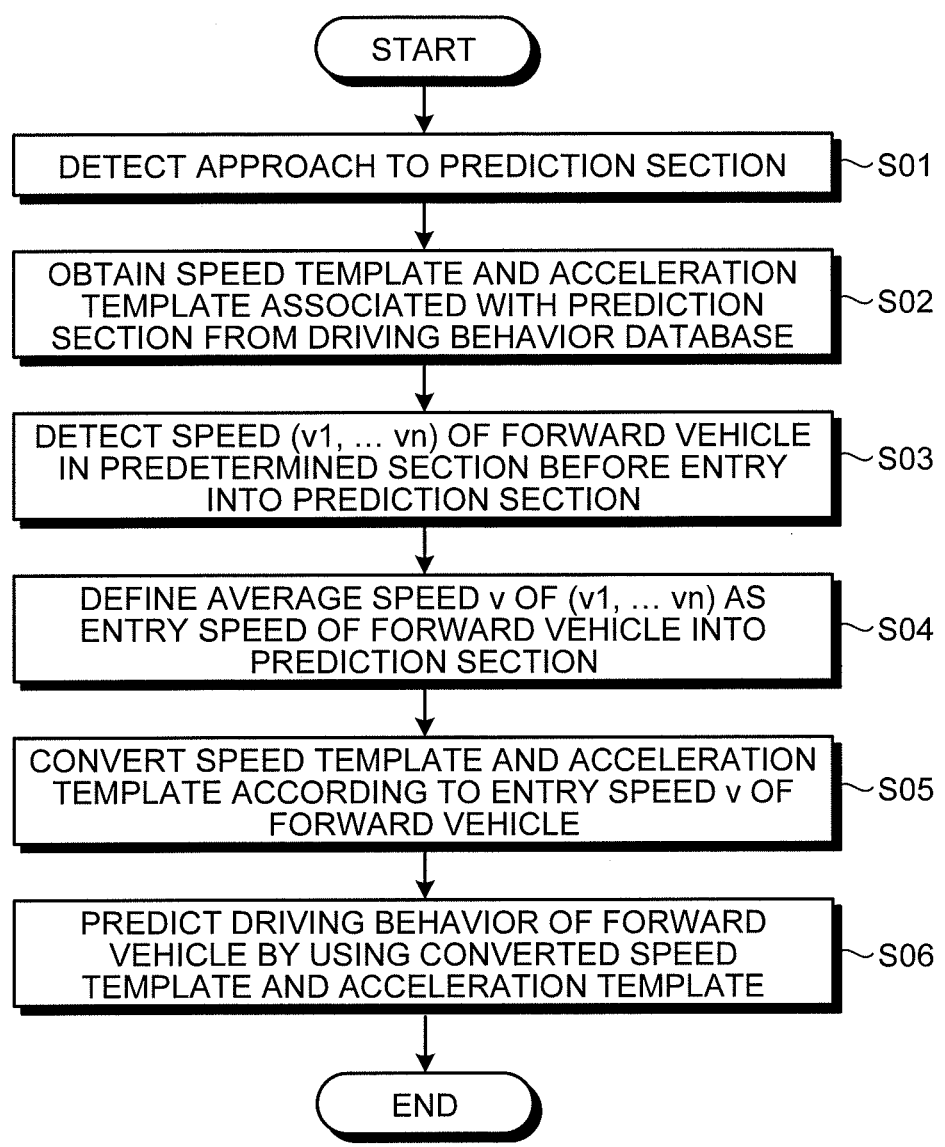
FIG. 6 is a flowchart illustrating a vehicle driving behavior predicting process performed by the vehicle driving behavior predicting device of this embodiment.

Next, operation of the vehicle driving behavior predicting device 1 according to this embodiment is described with reference to FIG. 6. FIG. 6 is a flowchart illustrating a vehicle driving behavior predicting process performed by the vehicle driving behavior predicting device 1 of this embodiment.

First, when the traveling environment of the vehicle 100 is specified by the traveling environment specifying unit 142 and an approach to the predetermined prediction section before the prediction target point is detected (S01), the template selecting unit 143 obtains the speed template 151 and the acceleration template 152 associated with the prediction section from the driving behavior database 150 (S02).

Next, speed information (v1 to vn) of the forward vehicle in a predetermined section before the entry into the prediction section is detected by the traveling environment specifying unit 142 (S03) and an average speed v of the speed information is defined as the entry speed of the forward vehicle into the prediction section (S04). Meanwhile, the predetermined section in which the speeds v1 to vn are detected may be an optional distance section or time section before the prediction section.

The template converting unit 144 converts the speed template 151 and the acceleration template 152 obtained at step S02 according to the entry speed v of the forward vehicle (S05). The method described with reference to FIGS. 4 and 5 may be used, for example, as the method of converting the template. The template converting unit 144 may change the speed template 151 and the acceleration template 152 such that they conform to the entry speed v of the forward vehicle by extracting to change the feature information changing depending on the entry speed v out of the feature information of the transition patterns of the speed template 151 and the acceleration template 152.

Then, the driving behavior predicting unit 145 predicts the driving behavior of the forward vehicle by using the speed template 151 and the acceleration template 152 converted at step S05 (S06). The driving behavior predicting unit 145 may predict whether the forward vehicle exhibits the decelerating behavior or the cruising behavior (non-decelerating behavior) at the prediction target position by comparing the speed template 151 and the acceleration template 152 converted by the template converting unit 144 with the time-series change in the speed and the acceleration of the forward vehicle detected by the detecting means. When the driving behavior predicting unit 145 outputs information of the prediction result to the assistance providing unit 161 of the driving assistance controller 160, the process of this flow is finished.

Next, an effect of the vehicle driving behavior predicting device 1 according to this embodiment is described.

The vehicle driving behavior predicting device 1 of this embodiment is configured to predict the driving behavior of the forward vehicle at the prediction target point based on the speed information or the acceleration information of the forward vehicle. The vehicle driving behavior predicting device 1 is provided with the driving behavior database 150 which stores the reference templates (speed template 151 and acceleration template 152) indicating the transition of the speed information or the acceleration information of the vehicle corresponding to the driving behavior being the prediction target in the predetermined prediction section to the prediction target point, the template converting unit 144 which converts the reference template to the converted template indicating the transition of the speed or the acceleration from the entry speed to a case in which the driving behavior being the prediction target is exhibited based on the entry speed of the forward vehicle into the prediction section, and the driving behavior predicting unit 145 which predicts the driving behavior of the forward vehicle at the prediction target point by comparing the converted template with the current transition of the speed information or acceleration information of the forward vehicle.

It becomes possible to convert a set of the speed template 151 and the acceleration template 152 based on the entry speed to use for predicting the driving behavior by this configuration, so that it becomes not necessary to individually prepare the template according to the traveling state of the vehicle and a storage capacity for storing the template may be minimized. The template is converted based on the entry speed of the vehicle to be used for predicting the driving behavior, so that the prediction according to the traveling state of the vehicle becomes possible and sufficient accuracy of the prediction of the driving behavior may be maintained.

Figure 7:
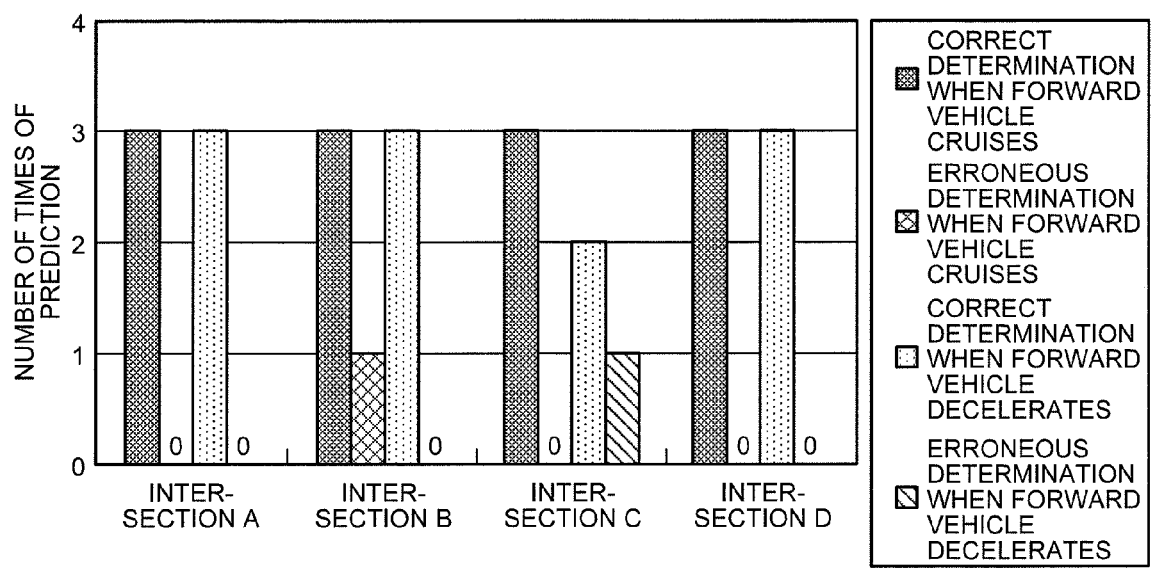
FIG. 7 is a table illustrating a determination result of vehicle behavior prediction by the vehicle driving behavior predicting device of this embodiment at the time of entry into a plurality of intersections.
Figure 8:
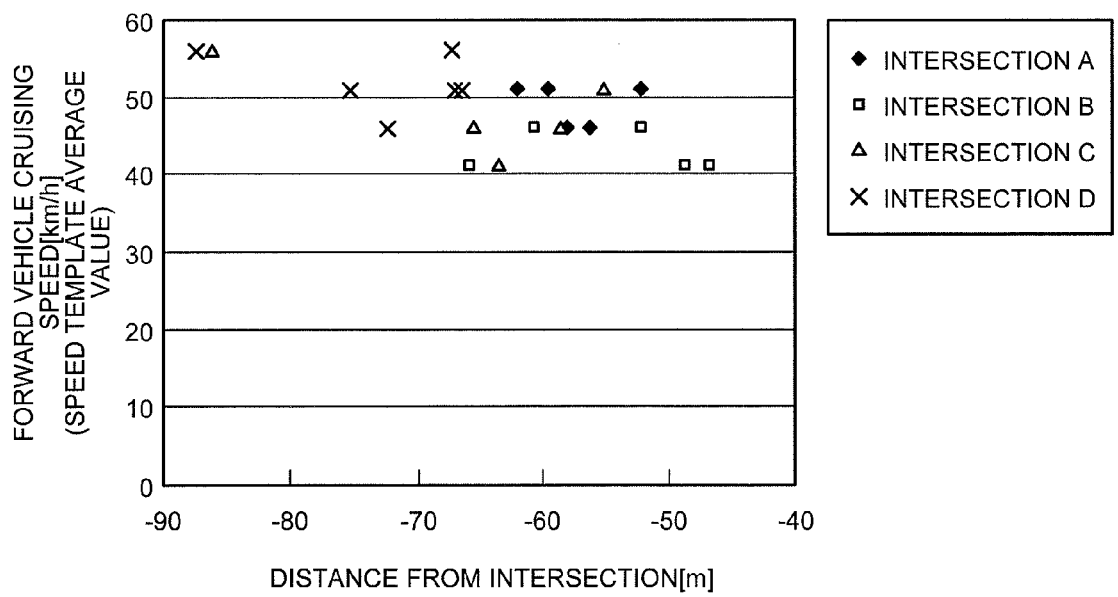
FIG. 8 is a view illustrating prediction timing at the time of correct determination in the determination result in FIG. 7.

Herein, the prediction accuracy by the vehicle driving behavior predicting device 1 of this embodiment is further described with reference to FIGS. 7 and 8. FIG. 7 is a table indicating a determination result of the driving behavior prediction by the vehicle driving behavior predicting device 1 of this embodiment at the time of the entry into a plurality of intersections. FIG. 8 is a view illustrating prediction timing when it is correctly determined in the determination result in FIG. 7. In a verification experiment illustrated in FIGS. 7 and 8, six templates with different cruising speeds were created by using the template converting method of this embodiment. Then, the decelerating behavior or the cruising behavior of the forward vehicle was predicted by using the created templates at four intersections A to D. The forward vehicle was allowed to travel at the cruising speeds of the created six templates and exhibit the decelerating behavior and the cruising behavior three times. That is to say, the driving behavior prediction was performed six times at each intersection (seven times at the intersection B) and the driving behavior prediction was performed a total of 25 times.

FIG. 7 is a graph indicating the determination results of the verification experiment. The determination results at the intersections A to D are represented along the horizontal axis from left in this order. At each intersection, the number of times of correct determination at the time of the cruise of the forward vehicle, the number of times of erroneous determination at the time of the cruise of the forward vehicle, the number of times of the correct determination at the time of the deceleration of the forward vehicle, and the number of times of the erroneous determination at the time of the deceleration of the forward vehicle are indicated by a bar graph from left in this order. Meanwhile, "0" is indicated in the table for an item, the number of times of which is 0. As illustrated in FIG. 7, at the intersections A and D, the determination was correct in all the templates for both the cruising behavior and the decelerating behavior. At the intersection B, all three decelerating behaviors were correctly determined but one of four cruising behaviors was erroneously determined. At the intersection C, all three cruising behaviors were correctly determined but one of three decelerating behaviors was erroneously determined. As a whole, 23 of the 25 times of prediction were correctly determined and an accuracy rate was 92%. In this manner, in the experiment result illustrated in FIG. 7, it was proved that the sufficient accuracy of the prediction of the driving behavior may be maintained by the method of this embodiment to convert the template according to the entry speed of the vehicle.

FIG. 8 is the view illustrating the prediction timing when it is correctly determined in the verification experiment. The distance from the intersection when the prediction result of the driving behavior is output and the cruising speed of each template are represented along the horizontal axis and the vertical axis, respectively, in FIG. 8. That is to say, it is illustrated that the prediction result is output more quickly as it is plotted on a left side in the drawing and that this is output more slowly as it is plotted on a right side. As illustrated in FIG. 8, the higher the speed during the cruise, the quicker the prediction is executed. An average of a point at which the prediction is completed was 62 m before the intersection. In the study heretofore, it is known that the driver becomes aware of the deceleration of the forward vehicle when the turn-signal lamp and the brake lamp of the forward vehicle are turned on and the timing at which the lamp is turned on is about 30 m before the intersection. Therefore, the experiment result illustrated in FIG. 8 proved that the driving behavior may be predicted quickly enough by the method of this embodiment in which the template is converted according to the entry speed of the vehicle.

In the vehicle driving behavior predicting device 1 of this embodiment, the driving behavior includes the decelerating behavior of the vehicle and the template converting unit 144 converts the positional information indicating the distance from the prediction target point, the speed information, and the acceleration information at the accelerator-off point and the brake-on point of the decelerating behavior on the reference template according to the entry speed into the prediction section.

The accelerator-off point and the brake-on point of the decelerating behavior are the feature information changing depending on the entry speed of the vehicle, so that it becomes possible to appropriately change the template according to the traveling state of the vehicle and to predict the driving behavior with high accuracy by changing them.

In the vehicle driving behavior predicting device 1 of this embodiment, the template converting unit 144 converts the speed information at the accelerator-off point A such that this is decreased according to the entry speed and converts the positional information at the accelerator-off point A such that this approaches the prediction target point O as the entry speed of the vehicle into the prediction section becomes lower to move the accelerator-off point A to the accelerator-off point C in the reference template indicating the transition of the speed information (speed template 151). The speed information and the positional information at the brake-on point B are converted and the brake-on point B is moved to the brake-on point D based on the change amounts of the speed information and the positional information between the accelerator-off point A and the brake-on point B before the conversion and the speed information and the positional information at the converted accelerator-off point C.

This configuration makes it possible to convert the template such that this approaches an actual speed transition of the vehicle at the time of the deceleration, and the accuracy of the prediction of the driving behavior may be further improved.

In the vehicle driving behavior predicting device 1 of this embodiment, the template converting unit 144 converts the positional information at the accelerator-off point E such that this approaches the prediction target point O2 as the entry speed of the vehicle into the prediction section becomes lower to move the accelerator-off point E to the accelerator-off point G in the reference template indicating the transition of the acceleration information (acceleration template 152). The acceleration information and the positional information at the brake-on point F are converted and the brake-on point F is moved to the brake-on point H based on the change amounts of the acceleration information and the positional information between the accelerator-off point E and the brake-on point F before the conversion, the acceleration information at the accelerator-off point E, and the positional information at the converted accelerator-off point G.

This configuration makes it possible to convert the template such that this approaches an actual acceleration transition of the vehicle at the time of the deceleration, and the accuracy of the prediction of the driving behavior may be further improved.

Although the embodiment of the present invention is described above, the above-described embodiment is presented as an example and it is not intended to limit the scope of the invention. The above-described embodiment may be carried out in various other modes and it is possible to omit, replace, and change this in various manners without departing from the gist of the invention. The above-described embodiment and variation thereof are included in the scope and the gist of the invention and are also included in the invention recited in claims and the equivalents thereof.

Although the forward vehicle is described as an example of the target the driving behavior of which is predicted in the above-described embodiment, the driving behavior predicting process described in the embodiment may also be applied to a case in which the driving behavior of the own vehicle is predicted. In this case, the template converting unit 144 calculates the entry speed of the own vehicle from the speed information of the vehicle 100 (own vehicle) obtained by the vehicle state detecting unit 110 and converts the speed template 151 and the acceleration template 152 based on the calculated entry speed of the own vehicle, for example. Then, the driving behavior predicting unit 145 predicts the driving behavior of the own vehicle by using the speed template 151 and the acceleration template 152 converted based on the entry speed of the own vehicle.

The assistance providing unit 161 may also provide the driving assistance appropriate for each situation in consideration of both the prediction results of the driving behaviors of the forward vehicle and the own vehicle input from the driving behavior predicting unit 145. The driving behavior may also be another vehicle behavior such as accelerating behavior and non-accelerating behavior of the vehicle 100 or the forward vehicle, for example. In this case, the assistance providing unit 161 may also provide the driving assistance appropriate for each situation based on the prediction result in which the driving behavior of the forward vehicle or the own vehicle is predicted as the accelerating behavior or the non-accelerating behavior.

Although the driving behavior predicting process is performed by using both the speed template 151 and the acceleration template in the above-described embodiment, it is also possible to use only one of them. The template regarding the traveling state information other than the speed and the acceleration may also be used.

Although the configuration in which the speed template 151 and the acceleration template 152 are stored in the driving behavior database 150 in the vehicle 100 is illustrated in the above-described embodiment, it may also be configured that they are externally obtained by using a communication device and the like.

Although the configuration in which the information regarding the accelerator-off point and the brake-on point is extracted as the feature information of the speed template 151 and the acceleration template 152 depending on the entry speed of the vehicle into the prediction section, the information is converted according to the entry speed, and according to this, the speed template 151 and the acceleration template 152 are converted is illustrated in the above-described embodiment, another feature information may also be converted.

REFERENCE SIGNS LIST 1 vehicle driving behavior predicting device
100 vehicle
144 template converting unit (converting means)
145 driving behavior predicting unit (predicting means)
150 driving behavior database (storage means)
151 speed template
152 acceleration template

The invention claimed is:

1. A vehicle driving behavior predicting device configured to predict a driving behavior of a vehicle at a prediction target point based on speed information or acceleration information of the vehicle, the device comprising:
   a storage unit configured to store a reference template indicating a transition of the speed information or the acceleration information of the vehicle corresponding to the driving behavior being a prediction target in a predetermined prediction section to the prediction target point;
   a converting unit configured to convert the reference template to a converted template indicating a transition of a speed or acceleration from an entry speed to a case in which the driving behavior being the prediction target is exhibited based on the entry speed of the vehicle into the prediction section; and
   a predicting unit configured to predict the driving behavior of the vehicle at the prediction target point by comparing the converted template with a current transition of the speed information or the acceleration information of the vehicle.

2. The vehicle driving behavior predicting device according to claim 1, wherein
   the driving behavior includes a decelerating behavior, and
   the converting unit is configured to convert positional information indicating a distance from the prediction target point, the speed information, or the acceleration information at an accelerator-off point and a brake-on point of the decelerating behavior on the reference template according to the entry speed into the prediction section.

3. The vehicle driving behavior predicting device according to claim 2, wherein
   the converting unit is configured to convert the speed information at the accelerator-off point so as to be decreased according to the entry speed and converts the positional information at the accelerator-off point so as to approach the prediction target point as the entry speed of the vehicle into the prediction section becomes lower in the reference template indicating the transition of the speed information, and
   to convert the speed information and the positional information at the brake-on point based on change amounts of the speed information and the positional information between the accelerator-off point and the brake-on point before conversion and the speed information and the positional information at the converted accelerator-off point.

4. The vehicle driving behavior predicting device according to claim 2, wherein the converting unit is configured to convert the positional information at the accelerator-off point so as to approach the prediction target point as the entry speed of the vehicle into the prediction section becomes lower in the reference template indicating the transition of the acceleration information, and to convert the acceleration information and the positional information at the brake-on point based on the acceleration information and the positional information between the accelerator-off point and the brake-on point before the conversion, the acceleration information at the accelerator-off point, and the positional information at the converted accelerator-off point.

5. The vehicle driving behavior predicting device according to claim 3, wherein the converting unit is configured to convert the positional information at the accelerator-off point so as to approach the prediction target point as the entry speed of the vehicle into the prediction section becomes lower in the reference template indicating the transition of the acceleration information, and to convert the acceleration information and the positional information at the brake-on point based on change amounts of the acceleration information and the positional information between the accelerator-off point and the brake-on point before the conversion, the acceleration information at the accelerator-off point, and the positional information at the converted.

* * * * *